United States Patent [19]
Wu

[11] Patent Number: 5,233,470
[45] Date of Patent: Aug. 3, 1993

[54] VARIABLE LENS ASSEMBLY

[75] Inventor: Chian-Hwa Wu, Taipei, Taiwan

[73] Assignee: Hsin Yi Foundation, Kaoshiung, Taiwan

[21] Appl. No.: 998,618

[22] Filed: Dec. 30, 1992

[51] Int. Cl.⁵ .......................... G02B 1/06; G02B 3/14; G02B 15/00
[52] U.S. Cl. .................... 359/666; 359/642; 359/676; 359/721; 359/896
[58] Field of Search ............... 359/511, 642, 665, 666, 359/676, 694, 708, 718, 721, 808, 811, 812, 802, 803, 818, 896

[56] References Cited
U.S. PATENT DOCUMENTS

| 504,890 | 8/1893 | Ohmart | 359/666 |
|---|---|---|---|
| 3,161,718 | 12/1964 | De Luca | 359/666 |
| 4,890,903 | 1/1990 | Treisman et al. | 359/666 |
| 4,913,536 | 4/1990 | Barnea | 359/666 |

FOREIGN PATENT DOCUMENTS

| 3630700 | 3/1988 | Fed. Rep. of Germany | 359/666 |
|---|---|---|---|
| 0036857 | 3/1980 | Japan | 359/666 |
| 0302301 | 12/1989 | Japan | 359/721 |

Primary Examiner—Bruce Y. Arnold
Assistant Examiner—David R. Parsons
Attorney, Agent, or Firm—Bucknam and Archer

[57] ABSTRACT

Disclosed is a variable lens assembly having a water chamber defined with a front lens holder between two flexible, transparent diaphragms and filled with a fluid, and a syringe connected to the front lens holder and controlled to vary the volume of the water chamber. The diaphragms are stretched to curve outwards and form into a biconvex lens as the plunger of the syringe is pushed forwards in compressing the fluid; the diaphragms are induced to curve inwards and form into a biconcave lens as the plunger of the syringe is pulled backwards in releasing the fluid.

9 Claims, 2 Drawing Sheets

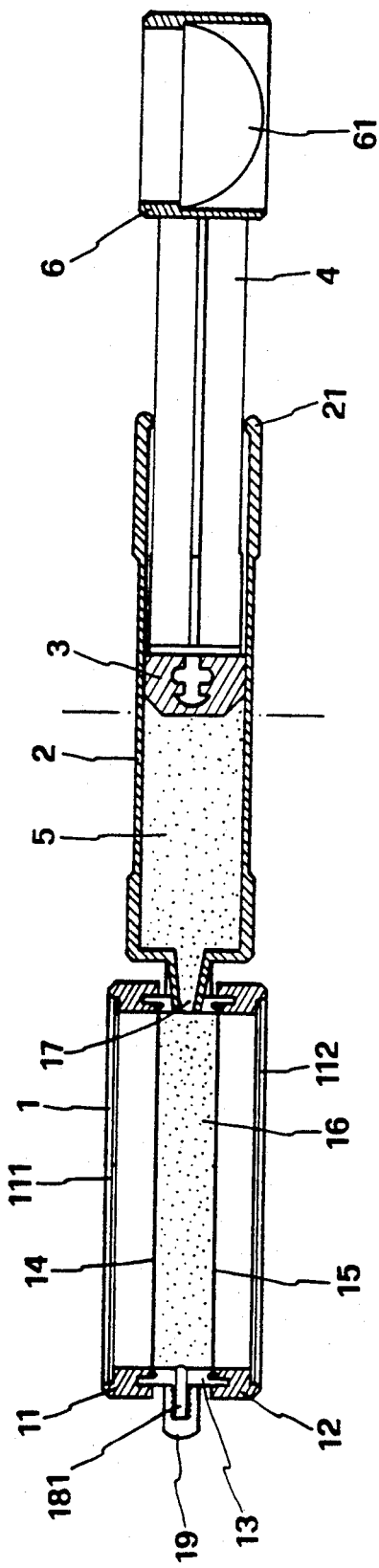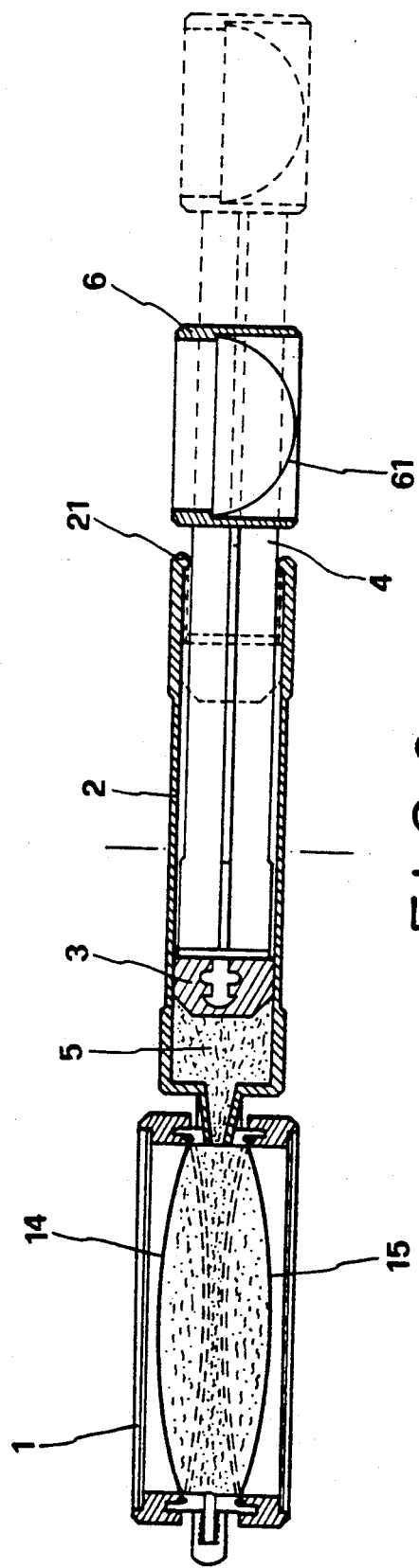

VARIABLE LENS ASSEMBLY

BACKGROUND OF THE INVENTION

The present invention relates to an optical lens, and more particularly to a variable lens assembly which can be conveniently adjusted to bring together or spread rays of light passing through it.

Different lenses may be used in different situations for different purposes. For example, a convex or biconvex lens may be used for converging rays of light; a concave or biconcave lens may be used for diverging rays of light. Therefore, several lenses may have to be prepared simultaneously for different purposes. Further, regular lenses are commonly made from glass, and therefore they may be broken easily.

SUMMARY OF THE INVENTION

The present invention has been accomplished under the aforesaid circumstances. It is therefore an object of the present invention to provide a variable lens assembly which can be conveniently adjusted to bring together or spread rays of light passing through it without making any structural change. It is another object of the present invention to provide a variable lens assembly which is durable in use. The present invention uses a syringe-like device to compress a fluid into a water chamber defined within a lens holder between two flexible, transparent diaphragms, or to release the fluid from the water chamber, and therefore the diagrams are stretched and formed into a biconvex lens or induced and formed into a biconcave lens.

BRIEF DESCRIPTION OF THE DRAWINGS

FIG. 2 is a longitudinal sectional view thereof; and

FIG. 3 is another longitudinal sectional view of the lens assembly changed to another mode.

DETAILED DESCRIPTION OF THE PREFERRED EMBODIMENT

Figure 1:
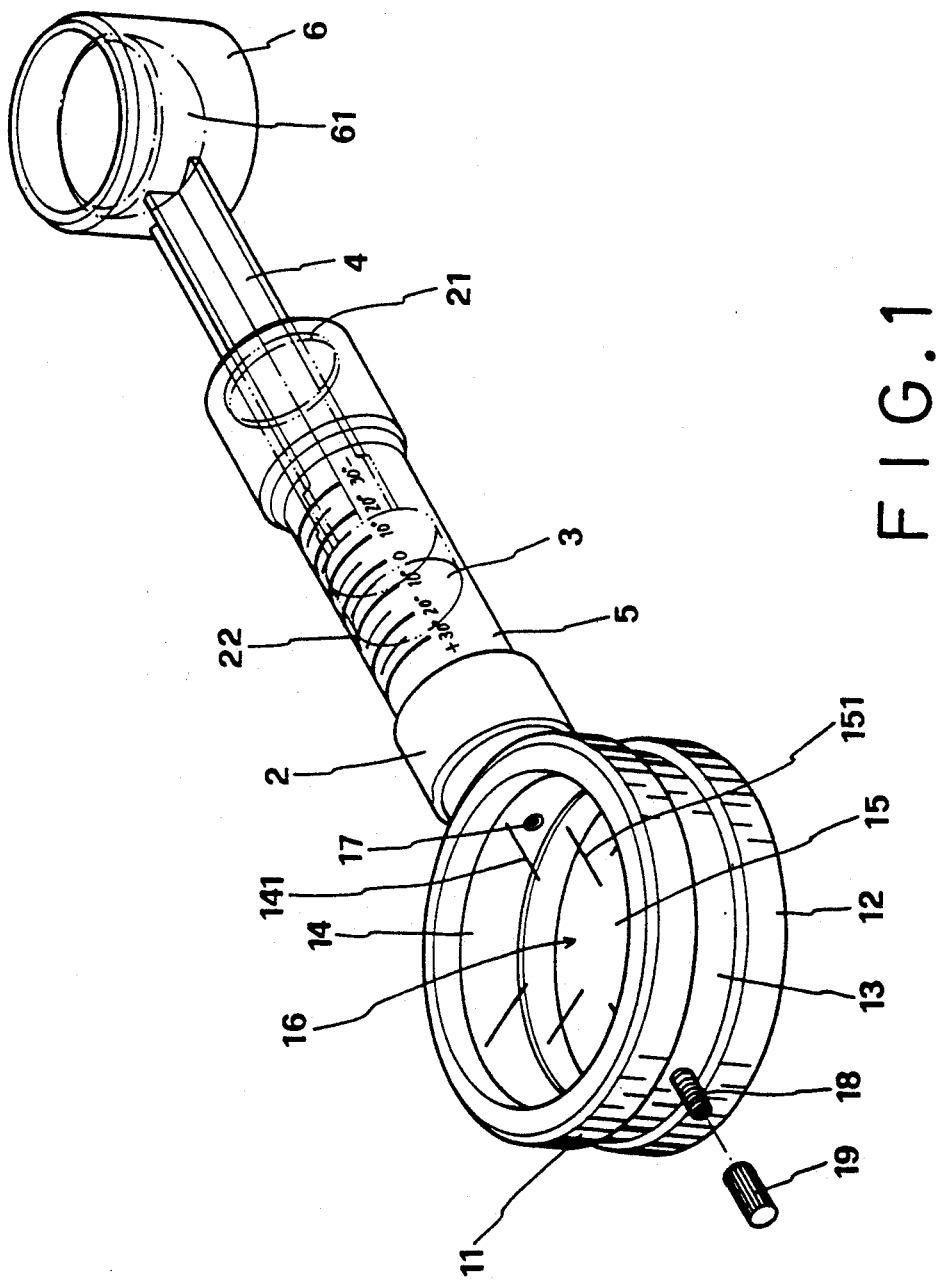
FIG. 1 is a perspective view of a lens assembly according to the present invention.

Referring to FIGS. 1 and 2, a lens assembly in accordance with the present invention is generally comprised of a front lens holder 1, a barrel 2, a seal 3, a plunger 4, a fluid 5, and a rear lens holder 6.

The front lens holder 1 comprises a top ring 11, a bottom ring 12 and an intermediate ring 13 respectively attached with one another in a vertical stack, a flexible, transparent top diaphragm 14 disposed horizontally between the top ring 11 and the intermediate ring 13, a flexible, transparent bottom diaphragm 15 disposed horizontally between the intermediate ring 13 and the bottom ring 12. Therefore, a water chamber 16 is defined within the rings 11, 12, 13 between the top and bottom diaphragms 14, 15. The intermediate ring 13 has a through hole 17, through which the fluid 5 flows between the water chamber 16 and the holding space of the barrel 2. Further, the top and bottom diaphragms 14, 15 are preferably made from a high polymer.

The barrel 2 is made from a hollow cylinder having front one end connected to the front lens holder 1 with its holding space disposed in communication with the water chamber 16 through the through hole 17. The barrel 2 may be separately made and then fastened to the front lens holder 1, or integrally made into part of the front lens holder 1. The rear end of the barrel 2 has an inward annular flange 21, which limits the backward stroke of the seal 3 within the barrel 2. Graduations 22 are marked on the barrel 2 for showing measure.

The seal 3 is made from an elastomer fitted into the barrel 2 and reciprocated within the barrel 2 by the plunger 4.

The plunger 4 has a front end coupled to the seal 3 and a rear end terminated to the rear lens holder 6.

The fluid 5 is a transparent fluid, which may be colorless or colored, filled in the water chamber 16 and part of the barrel 2.

The rear lens holder 6 is made in the shape of a hollow cylinder connected to the plunger 2 at one end, having a hollow spherical lens 61 on the inside for trying experiments in converging and diverging rays of light.

Referring to FIGS. 2 and 3, the liquid 5 is squeezed into the water chamber 16 by pushing the plunger 4 forwards (from zero degree toward +30°), causing the top and bottom diaphragms 14,15 to curve outwards in reverse directions, and therefore the top and bottom diaphragms 14,15 form into a biconvex lens for magnifying the apparent dimensions of objects. On the contrary, pulling the plunger 4 backwards (from zero degree toward −30°) causes the top and bottom diaphragms 14,15 to curve inwards toward each other, and therefore the top and bottom diaphragms 14,15 form into a biconcave lens (see the dotted lines in FIG. 3) for contracting the apparent dimensions of objects. As the front end of the seal 3 is stopped at the zero degree, the top and bottom diaphragms 14,15 are disposed in parallel with each other, and therefore they neither magnifying nor contracting the apparent dimensions of objects.

According to the aforesaid statement, the intensity of magnification or contraction of the lens formed of the top and bottom diaphragms 14,15 varies with the location of the seal 3 in the barrel 2. Markings 141,151 may be made on the top and bottom diaphrags 14,15 for showing the change of curvature. Transparent protective layers 111,112 may be respective covered over the top and bottom diaphragms 14,15 on the outside for protection. A nozzle tip 18 may be made on the intermediate ring 13 opposite to the through hole 17 with its nozzle hole 181 communicated with the water chamber 16 for drawing off the fluid 5 from the water chamber 16 or sucking in new fluid into the water chamber 16. A cap 19 is provided to seal the nozzle tip 18.

The embodiment described is simple in structure and therefore functional. It will be obvious to those stilled in the art that various changes could be made without departing from the basic teachings of the invention and the invention is not to be considered limited to what is shown in the drawings and described in the specification. For example, the plunger 4 may be fastened to the barrel 2 through a screw joint and rotated to move the seal 3 back and forth within the barrel 2.

What is claimed is:

1. A variable lens assembly comprising:
   a front lens holder having two flexible, transparent, horizontal diaphragms uniformly spaced from each other, a water chamber defined between said diaphragms, and a water passage hole;
   a rear lens holder having a hollow spherical lens means on the inside for trying experiments in converging and diverging rays of light;
   a barrel having a front end connected to said front lens holder and communicated with said water chamber through said water passage hole, and a rear end terminated to an inward annular flange;

a plunger having a front end inserted through said inward annular flange into said barrel and coupled with a seal and a rear end connected to said rear lens holder;

a fluid filled in said water chamber and part of said barrel; and whereby pushing said plunger forward to compress said fluid causes said diaphragms to curve outwards in reverse directions and form into a biconvex lens; pulling said plunger backwards to release said fluid causes said diaphragms to curve inwards toward each other and form into a biconcave lens.

2. The variable lens assembly of claim 1 wherein said diaphragms are respectively covered with a transparent protective layer on the outside.

3. The variable lens assembly of claim 1 wherein said diaphragms are marked with markings for checking the respective curvature.

4. The variable lens assembly of claim 1 wherein said front lens holder further comprises a nozzle tip means covered with a cap for drawing off said fluid from said water chamber or sucking in a new fluid into said water chamber.

5. The variable lens assembly of claim 1 wherein said barrel is marked with graduations for showing measure.

6. The variable lens assembly of claim 1 wherein said top and bottom diaphragms are respectively made from a transparent polymer.

7. The variable lens assembly of claim 1 wherein said fluid is a colorless fluid.

8. The variable lens assembly of claim 1 wherein said fluid is a colored fluid.

9. The variable lens assembly of claim 1 wherein said plunger is fastened to said barrel through a screw joint and rotated to move said seal back and forth within said barrel.

* * * * *